(12) United States Patent
Strock

(10) Patent No.: US 11,059,096 B2
(45) Date of Patent: Jul. 13, 2021

(54) ABRADABLE MATERIAL FEEDSTOCK AND METHODS AND APPARATUS FOR MANUFACTURE

(71) Applicant: United Technologies Corporation, Farmington, CT (US)

(72) Inventor: Christopher W. Strock, Kennebunk, ME (US)

(73) Assignee: Raytheon Technologies Corporation, Farmington, CT (US)

(*) Notice: Subject to any disclaimer, the term of this patent is extended or adjusted under 35 U.S.C. 154(b) by 244 days.

(21) Appl. No.: 16/245,748

(22) Filed: Jan. 11, 2019

(65) Prior Publication Data

US 2019/0143404 A1 May 16, 2019

Related U.S. Application Data

(62) Division of application No. 15/223,480, filed on Jul. 29, 2016, now Pat. No. 10,315,249.

(51) Int. Cl.
*B22F 1/00* (2006.01)
*C08J 3/12* (2006.01)
*B22F 1/02* (2006.01)

(52) U.S. Cl.
CPC .......... *B22F 1/0096* (2013.01); *B22F 1/0003* (2013.01); *B22F 1/0059* (2013.01); *B22F 1/02* (2013.01); *B22F 1/025* (2013.01); *C08J 3/122* (2013.01); *C08J 3/128* (2013.01); *B22F 2201/05* (2013.01); *B22F 2202/01* (2013.01); *B22F 2999/00* (2013.01)

(58) Field of Classification Search
CPC .... B22F 1/0059; B22F 1/0003; B22F 1/0096; B22F 1/02; B22F 1/025; C08J 3/122; C08J 3/128

USPC ............... 427/217; 266/251; 419/35, 36, 37; 451/28
See application file for complete search history.

(56) References Cited

U.S. PATENT DOCUMENTS 3,196,032 A   7/1965 Seymour
3,397,057 A * 8/1968 Harrington ............... B01J 2/28
                                                    419/31

(Continued)

FOREIGN PATENT DOCUMENTS

WO    2007/139735 A2    12/2007
WO    2008/090427 A1    7/2008

OTHER PUBLICATIONS

A Guidebook to Particle Size Analysis, Sep. 2014, Horiba Instruments, Inc., Irvine, CA.

(Continued)

*Primary Examiner* — Jessee R Roe
*Assistant Examiner* — Michael Aboagye
(74) *Attorney, Agent, or Firm* — Bachman & LaPointe, P.C.

(57) ABSTRACT

An apparatus for manufacturing a powder has: a chamber; a temperature control system for the chamber interior; and a conveyor within the chamber. First, second, and third powder sources supply respective first, second, and third powders along respective first, second, and third powder flowpaths. The second and third flowpaths merge with the first flowpath along the conveyor. The apparatus comprises a vaporizer for vaporizing a solvent to be delivered to the second and third powders along the second and third powder flowpaths.

20 Claims, 3 Drawing Sheets

(56) References Cited

U.S. PATENT DOCUMENTS

| | | | |
|---|---|---|---|
| 4,060,414 A * | 11/1977 | Kaufman | B22F 1/025 |
| | | | 75/246 |
| 4,299,865 A | 11/1981 | Clingman et al. | |
| 4,386,112 A | 5/1983 | Eaton et al. | |
| 4,389,797 A * | 6/1983 | Spigarelli | B01D 3/00 |
| | | | 34/73 |
| 4,544,102 A | 10/1985 | Hahn et al. | |
| 4,615,768 A * | 10/1986 | McCord | B01D 1/00 |
| | | | 134/109 |
| 4,696,855 A | 9/1987 | Pettit, Jr. et al. | |
| 4,975,300 A * | 12/1990 | Deviny | B05D 3/0473 |
| | | | 427/335 |
| 5,434,210 A | 7/1995 | Rangaswamy et al. | |
| 5,660,934 A | 8/1997 | Longo | |
| 5,780,116 A | 7/1998 | Sileo et al. | |
| 6,479,012 B2 * | 11/2002 | Rao | B22F 1/0096 |
| | | | 419/36 |
| 6,551,376 B1 | 4/2003 | Beal | |
| 6,916,529 B2 | 7/2005 | Pabla et al. | |
| 6,969,231 B2 | 11/2005 | Ghasripoor et al. | |
| 7,582,362 B2 | 9/2009 | Fiala et al. | |
| 8,562,290 B2 | 10/2013 | Strock et al. | |
| 8,777,562 B2 | 7/2014 | Strock et al. | |
| 10,315,249 B2 * | 6/2019 | Strock | C08J 3/128 |
| 2006/0135670 A1 | 6/2006 | Richter et al. | |
| 2008/0145554 A1 | 6/2008 | Ghasripoor et al. | |
| 2009/0077826 A1 | 3/2009 | Pfeffer et al. | |
| 2010/0124616 A1 | 5/2010 | Rosenzweig et al. | |
| 2015/0308281 A1 | 10/2015 | Strock | |
| 2017/0146024 A1 | 5/2017 | Leslie et al. | |

OTHER PUBLICATIONS

European Search Report dated Dec. 6, 2017 for European Patent Application No. 17183741.2.
Li Yao et al., Characterization of Electrostatic Charges in Freely Bubbling Fluidized Beds with Dielectric Particles, Mar. 20, 2002, pp. 183-197, Elsevier Science, B.V., Amsterdam, the Netherlands.
U.S. Office Action dated Sep. 13, 2017 for U.S. Appl. No. 15/223,480.
U.S. Office Action dated Feb. 26, 2018 for U.S. Appl. No. 15/223,480.
U.S. Office Action dated Jun. 22, 2018 for U.S. Appl. No. 15/223,480.
European Search Report dated Jun. 8, 2020 for European Patent Application No. 20154202.4.

* cited by examiner

ABRADABLE MATERIAL FEEDSTOCK AND METHODS AND APPARATUS FOR MANUFACTURE

CROSS-REFERENCE TO RELATED APPLICATION

This is a divisional application of U.S. patent application Ser. No. 15/223,480, filed Jul. 29, 2016, and entitled "Abradable Material Feedstock and Methods and Apparatus for Manufacture", now U.S. Pat. No. 10,315,249, the disclosure of which is incorporated by reference herein in its entirety as if set forth at length.

BACKGROUND

This disclosure relates to agglomerate powders for thermal spray. More particularly, it relates to such powders for forming gaspath leakage seals for gas turbine engines.

Gas turbine engines, such as those used to power modern commercial and military aircraft, generally include one or more compressor sections to pressurize an airflow, a combustor section for burning hydrocarbon fuel in the presence of the pressurized air, and one or more turbine sections to extract energy from the resultant combustion gases. The airflow flows along a gaspath through the gas turbine engine.

The gas turbine engine includes a plurality of rotors arranged along an axis of rotation of the gas turbine engine. The rotors are positioned in a case, with the rotors and case having designed clearances between the case and tips of rotor blades of the rotors. It is desired to maintain the clearances within a selected range during operation of the gas turbine engine as deviation from the selected range can have a negative effect on gas turbine engine performance. For each blade stage, the case typically includes an outer airseal located in the case immediately outboard (radially) of the blade tips to aid in maintaining the clearances within the selected range.

Within the compressor section(s), temperature typically progressively increases from upstream to downstream along the gaspath. Particularly, in relatively downstream stages, heating of the airseals becomes a problem. U.S. patent application Ser. No. 14/947,494, of Leslie et al., entitled "Outer Airseal for Gas Turbine Engine", and filed Nov. 20, 2015 ('494 application), the disclosure of which is incorporated by reference in its entirety herein as if set forth at length, discusses several problems associated with heat transfer to outer airseals and several solutions.

The airseal typically has an abradable coating along its inner diameter (ID) surface. In relatively downstream stages of the compressor where the blades have nickel-based superalloy substrates, the abradable coating material may be applied to a bondcoat along the metallic substrate of the outer airseal. For relatively upstream sections where the compressor blades comprise titanium-based substrates (a potential source of fire) systems have been proposed with a fire-resistant thermal barrier layer intervening between the bondcoat and the abradable material. An example of such a coating is found in U.S. Pat. No. 8,777,562 of Strock et al., issued Jul. 15, 2014 and entitled "Blade Air Seal with Integral Barrier".

Among coating application techniques are thermal spray processes such as air plasma spray. Typically, the plasma spray process involves a single feedstock outlet discharging a mixture of coating constituents and fugitive porosity former in to a plasma jet. Proposals have been made to segregate the porosity former and introduce that through a relatively downstream outlet while the matrix and solid lubricant are introduced from a conventionally located upstream outlet. Examples of these are found in U.S. Pat. No. 4,696,855, of Petit, Jr. et al., issued Sep. 29, 1987, and entitled "Multiple Port Plasma Spray Apparatus and Method for Providing Sprayed Abradable Coatings", and U.S. Pat. No. 4,299,865, of Clingman et al., issued Nov. 10, 1981 and entitled "Abradable Ceramic Seal and Method of Making Same". U.S. Pat. No. 4,386,112, of Eaton et al., issued May 31, 1983, and entitled "Co-Spray Abrasive Coating" shows separate introduction of matrix and abrasive in an abrasive coating.

SUMMARY

One aspect of the disclosure involves a method for manufacturing a powder, the method comprising: vaporizing a solvent; passing a metallic powder and a polymer powder through the solvent vapor to mix the metallic powder with the polymer powder; and removing said solvent.

A further embodiment may additionally and/or alternatively include the metallic powder being a second metallic powder. The method further comprises driving a flow of a first metallic powder along a flowpath. The method further comprises introducing the second metallic powder and polymer powder to the flow of the first metallic powder.

A further embodiment may additionally and/or alternatively include vibratory mixing of the mixed second metallic powder and polymer powder and the first metallic powder to produce a blend.

A further embodiment may additionally and/or alternatively include size classifying the blend.

A further embodiment may additionally and/or alternatively include the size classifying comprising: feeding back undersize particles to a source of the first metallic powder or the second metallic powder; and crushing oversize particles and feeding the crushed particles back into a classifier performing the size classifying.

A further embodiment may additionally and/or alternatively include controlling a temperature of the first metallic powder to a first temperature; controlling a temperature of the second metallic powder to a second temperature; and controlling a temperature of the polymer powder to a third temperature.

A further embodiment may additionally and/or alternatively include the first temperature being greater than the second temperature and the second temperature being greater than the third temperature.

A further embodiment may additionally and/or alternatively include the first temperature being equal to or greater than a dew point of the solvent vapor; the second temperature being equal to or less than the dew point; and the third temperature being less than the dew point.

A further embodiment may additionally and/or alternatively include the controlling the temperature of the first metallic powder to the first temperature comprising heating; the controlling the temperature of the second metallic powder to the second temperature comprising heating; and the controlling the temperature of the polymer powder to the third temperature comprising cooling.

A further embodiment may additionally and/or alternatively include an overlapping powder delivery process of the second metallic powder and the polymer powder providing: the mixing of the second metallic powder and the polymer powder; and the introduction of the mixed second metallic powder and polymer powder to the flow of the first metallic powder.

A further embodiment may additionally and/or alternatively include the overlapping powder delivery process comprising: delivering the second metallic powder onto the flow of the first metallic powder over a first footprint; and delivering the polymer powder over a second footprint within the first footprint.

A further embodiment may additionally and/or alternatively include the overlapping powder delivery process comprises overlapping spraying.

A further embodiment may additionally and/or alternatively include the first metallic powder and the second metallic powder being of alloys of the same composition.

A further embodiment may additionally and/or alternatively include maintaining the solvent vapor at a partial pressure of at least 50% of a chamber atmosphere.

A further embodiment may additionally and/or alternatively include comprising acetone.

A further embodiment may additionally and/or alternatively include passing a non-metallic filler through the solvent vapor.

Another aspect of the disclosure involves an apparatus for manufacturing a powder. The apparatus comprises: a chamber; a temperature control system for the chamber interior; a vibratory conveyor within the chamber; a first powder source within or coupled to the chamber; a first powder flowpath from the first powder source through the chamber and passing along the vibratory conveyor; a second powder source within or coupled to the chamber; a second powder flowpath from the second powder source merging with the first powder flowpath along the vibratory conveyor; a third powder source within or coupled to the chamber; a third powder flowpath from the third powder source merging with the first powder flowpath along the vibratory conveyor; and a vaporizer within the chamber or coupled thereto to deliver vaporized liquid to the chamber.

A further embodiment may additionally and/or alternatively include: a classifier; and a return flowpath from the classifier to the first flowpath.

A further embodiment may additionally and/or alternatively include the classifier being a two-stage classifier with the first stage having an over-size particle flowpath passing back through a crusher.

A further embodiment may additionally and/or alternatively include the temperature control system comprising a heater.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
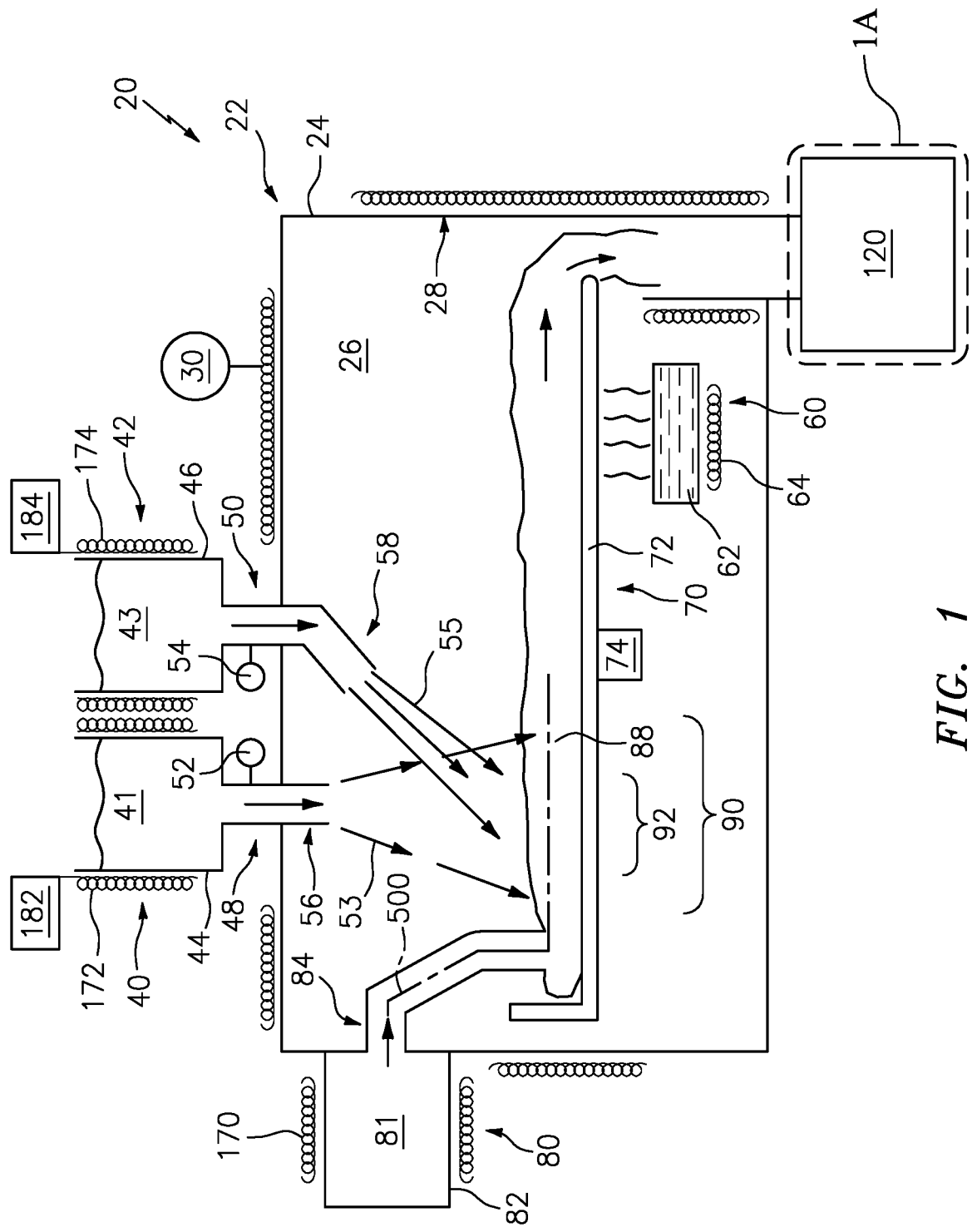
FIG. 1 is a partially schematic view of a powder-producing apparatus.

FIG. 1 shows an apparatus 20 for producing a feedstock for thermal spray processes. The exemplary feedstock is a powder. The particles of the powder are, themselves made up of multiple particles of constituent powders. In one group of embodiments, the constituent powders comprise one or more metallic powders for ultimately forming a matrix of the sprayed material. Additional powders include a fugitive porosity former ("fugitive") to form porosity in the ultimate coating (e.g., after a bake-out or chemical removal) and may include other non-metallic powders such as solid lubricants or other fillers to affect friability or other properties of the sprayed material.

Figure 2:
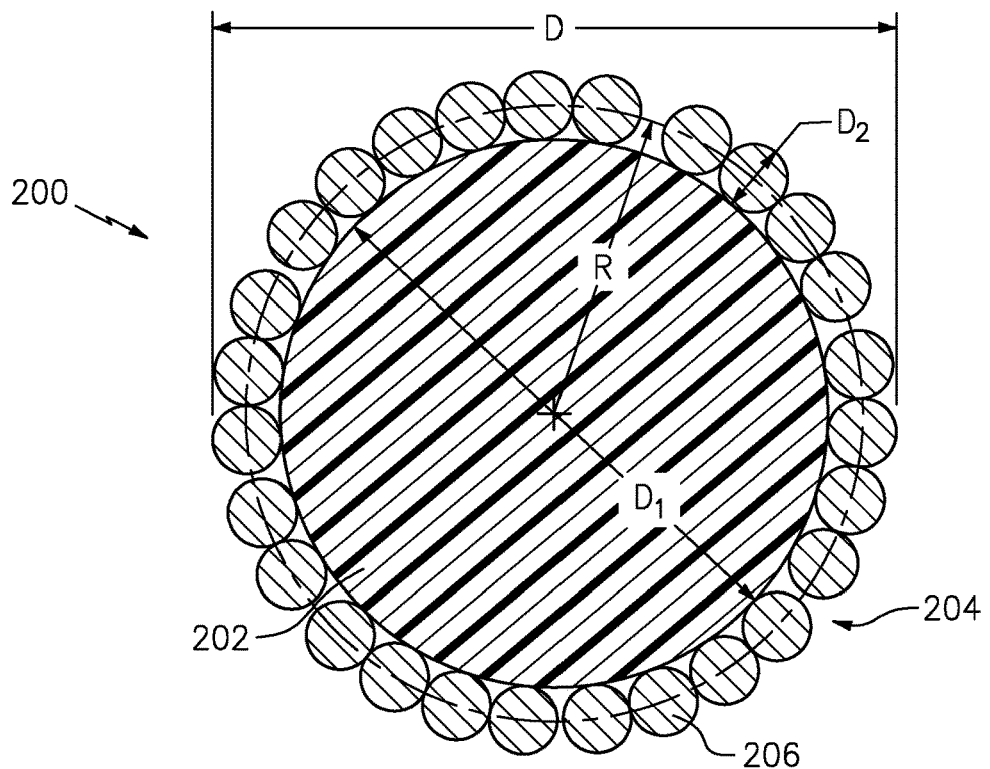
FIG. 2 is a schematic sectional view of a first agglomerate.
Figure 3:
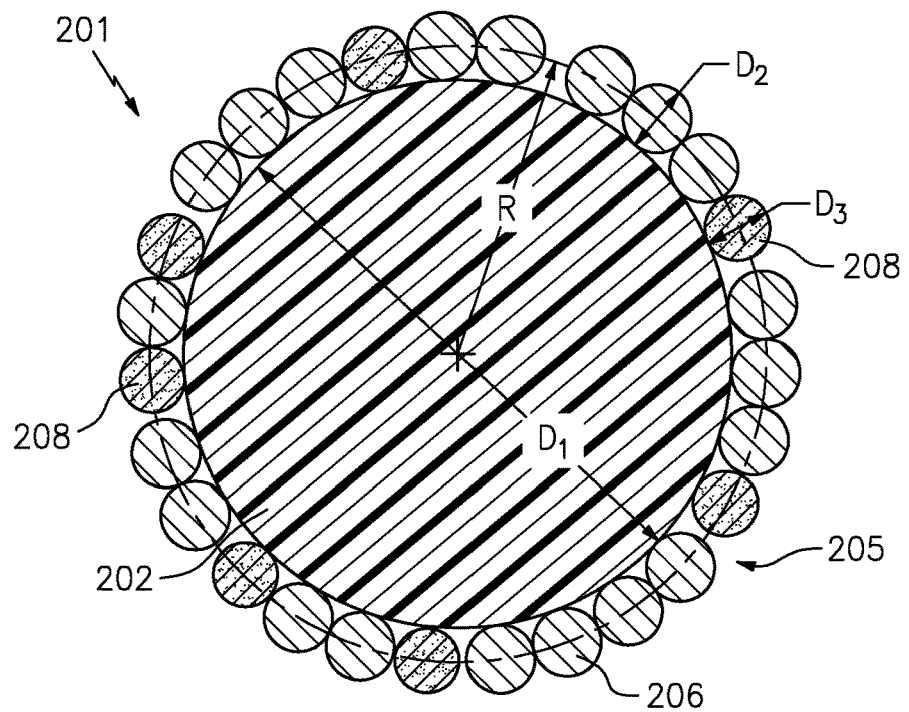
FIG. 3 is a schematic sectional view of a second agglomerate.

For example, FIGS. 2 and 3 respectively schematically show a two-component powder agglomerate particle 200 and a three-component powder agglomerate particle 201. Each has a core 202 formed by a single particle of the fugitive. A shell 204, 205 is formed of multiple particles, namely alloy particles 206 in FIG. 2 and a combination of alloy particles 206 and non-metallic filler particles 208 in FIG. 3.

The agglomerate component particles may be modeled as spheres. If the core 202 of agglomerate 200 has a diameter $D_1$ and the alloy particles each have a diameter $D_2$, the overall particle may be modeled as having a diameter $D=D_2+2D_1$. Maximum theoretical coverage of the core surface may not be achieved in practice. Thus, some fraction of this may be used to calculate parameters that represent overall by volume alloy content to, in turn, predict overall by volume alloy content in the ultimate coating. Similar calculations may be performed for the three-component agglomerate particle 201. A sample calculation calculates the surface of a sphere of radius $R=0.5(D_1+D_2)$ as $4\Pi R^2$. An amount of the alloy particles may be calculated to cover that area up to a packing limit. An exemplary modelling models the alloy particles' cross-sectional area as covering 60% of that sphere surface which is a little less than the hexagonal close packed or square array packing. The table below uses that 60% figure as a fractional coverage of 0.6.

TABLE I

Component Dimensions and Relative Volumes

| D1 (µm) | D2 (µm) | D (µm) | Assumed Fractional coverage | Fugitive Volume Fraction | Alloy Volume Fraction |
|---|---|---|---|---|---|
| 50 | 22 | 94 | 0.60 | 0.077 | 0.923 |
| 100 | 22 | 144 | 0.60 | 0.188 | 0.812 |
| 150 | 22 | 194 | 0.60 | 0.282 | 0.718 |
| 50 | 16 | 82 | 0.60 | 0.157 | 0.843 |
| 100 | 16 | 132 | 0.60 | 0.326 | 0.674 |
| 150 | 16 | 182 | 0.60 | 0.444 | 0.556 |
| 50 | 11 | 72 | 0.60 | 0.316 | 0.684 |
| 100 | 11 | 122 | 0.60 | 0.528 | 0.472 |
| 150 | 11 | 172 | 0.60 | 0.642 | 0.358 |
| 50 | 9 | 68 | 0.60 | 0.425 | 0.575 |
| 100 | 9 | 118 | 0.60 | 0.634 | 0.366 |
| 150 | 9 | 168 | 0.60 | 0.733 | 0.267 |
| 50 | 6 | 62 | 0.60 | 0.649 | 0.351 |
| 100 | 6 | 112 | 0.60 | 0.805 | 0.195 |
| 150 | 6 | 162 | 0.60 | 0.865 | 0.135 |

For a three-component system, a similar approximation may be used.

The apparatus 20 comprises a chamber 22 having a wall structure 24 (e.g., top, bottom sides, and ends). The chamber has an interior 26 generally bounded by an interior surface 28 of the wall structure. A temperature control system 30 may control the temperature of the interior surface for purposes such as causing or preventing condensation of solvent vapor. As is discussed below, the solvent renders the fugitive porosity former sticky to adhere the other powders thereto. Thus, depending on implementation, the system 30 may serve as or be a heater, cooler, or both. Exemplary systems 30 are thermoelectric systems, vapor compression systems (having a heat exchanger integrated with the wall structure), or resistance or other heaters.

The apparatus 20 includes several sources of the constituent powders. In an example of a metallic matrix-forming powder and a polymeric fugitive porosity forming powder (fugitive powder), a source 40 may provide metallic powder 41 (e.g., a Cu—Ni alloy (e.g., Cu26Ni8.5Al4Cr) or an MCrAlY (although the Y may be eliminated in lower temperature engine locations) and a source 42 may provide the fugitive powder 43 (e.g., polymethyl methacrylate (PMMA)). The sources may comprise a reservoir 44, 46 of the respective powders and a feed mechanism 48, 50. Exemplary feed mechanisms are spray feed mechanisms using a carrier gas from a carrier gas source 52, 54 (although shown separately, the carrier gas sources may at least partially overlap such as using one or more gas cylinders in common) and discharging respective sprays 53, 55 through respective nozzles 56, 58. As is discussed below, the spray discharge produces mixing of the powders. Exemplary carrier gas is nitrogen. Nitrogen (or an inert carrier gas) serves to limit oxygen when using flammable solvent. If using water solvent (e.g., with PVA fugitive particles), air may be used.

To form agglomerates, the atmosphere within the chamber contains vapors of a solvent for the fugitive powder. The vapors may be provided by a vaporizer 60 within or communicating with the chamber interior. The vaporizer may comprise a reservoir or other body of solvent 62 and a heater 64 (e.g., resistive) for heating and vaporizing the solvent. Another vaporizer example uses the bottom of the chamber as the vaporizer (e.g., a heated pool of solvent along the bottom). As the spray 55 passes through the solvent vapor, its particles pick up solvent and become sticky to clump with the particles of the spray 53. A conveyor 70 passes the mixed particles downstream along a main flowpath for further processing such as solvent removal and classification (discussed below).

The atmosphere in the chamber may be up to 100% solvent vapor (in which case the temperatures will all be related to the boiling point of the solvent (at atmospheric pressure)). In practice, the atmosphere will have some other gases. These gases would include the carrier gas(es) plus any other gases which may come in via the powder introduction, plus leakage, residual air, outgassing, and the like. Such gases give the atmosphere some reduced vapor pressure (fraction) of the solvent.

To the extent that the atmosphere is <100% solvent, then the temperature of condensation (dew point) will be reduced. Exemplary solvent vapor partial pressure is at least 50% of the chamber atmosphere or at least 75% or at least 90%.

The exemplary conveyor 70 is a vibratory conveyor having a bed 72 and a vibration mechanism 74 (e.g., motor-driven, piezoelectric, pneumatic, or the like. The exemplary conveyor uses a metallic powder to protect the bed 72. A source 80 provides this metallic powder 81 and may include a reservoir 82 and a feed mechanism 84 an exemplary feed mechanism is a feedscrew or other non-spray system, although spray systems are alternatives. The powders 41 and 81 may be the same, or they may be the same alloy but differing in morphology due to feedback issues (discussed below) or preprocessing of the powder 41 (discussed below) or may be more fundamentally different such as differing alloys or differing size. In one differing size example, the particles of the powder 81 may be very large such that they do not pass through a classifier and get recycled back to the source 80 (perhaps with some of the fugitive powder 43 and alloy powder 41).

In this example, a flowpath 500 extends downstream from the source 80. The flowpath extends along the bed 72. The alloy powder 81 forms a base layer 88 atop the bed 72 and the alloy powder 41 is sprayed atop the base layer along a footprint 90. The footprint 90 at least partially overlaps with a footprint 92 of the spray 55 of the fugitive powder 43. In the illustrated example, the footprint 90 leads the footprint 92 (i.e., the upstream extreme of the footprint 90 is upstream of the upstream extreme of the footprint 92). This means the powder 43 generally lands atop the powder 41. In the exemplary embodiment, the downstream (along the flowpath) extreme of the footprint 90 is downstream of the downstream extreme of the footprint 92. This may help fully embed the fugitive powder 43 in the alloy powder 41. Nevertheless, particular morphologies of final feedstock may be obtained by varying the footprints as well as the particle sizes and flow rates of the constituent powders.

The vibratory conveyor 70 may cause some portion of the powder 81 to mix with the other powders in the final spray feedstock. For this reason, the chemistry and particle size of the powder 81 may be chosen for its role in the ultimate spray feedstock. At its simplest, this consideration suggests using the same particle size and chemistry as for the powder 41.

In another example, there is no separate source 80. Instead, the source 40 may have a relatively larger footprint 90 extending further upstream of the footprint 92.

Figure 1A:
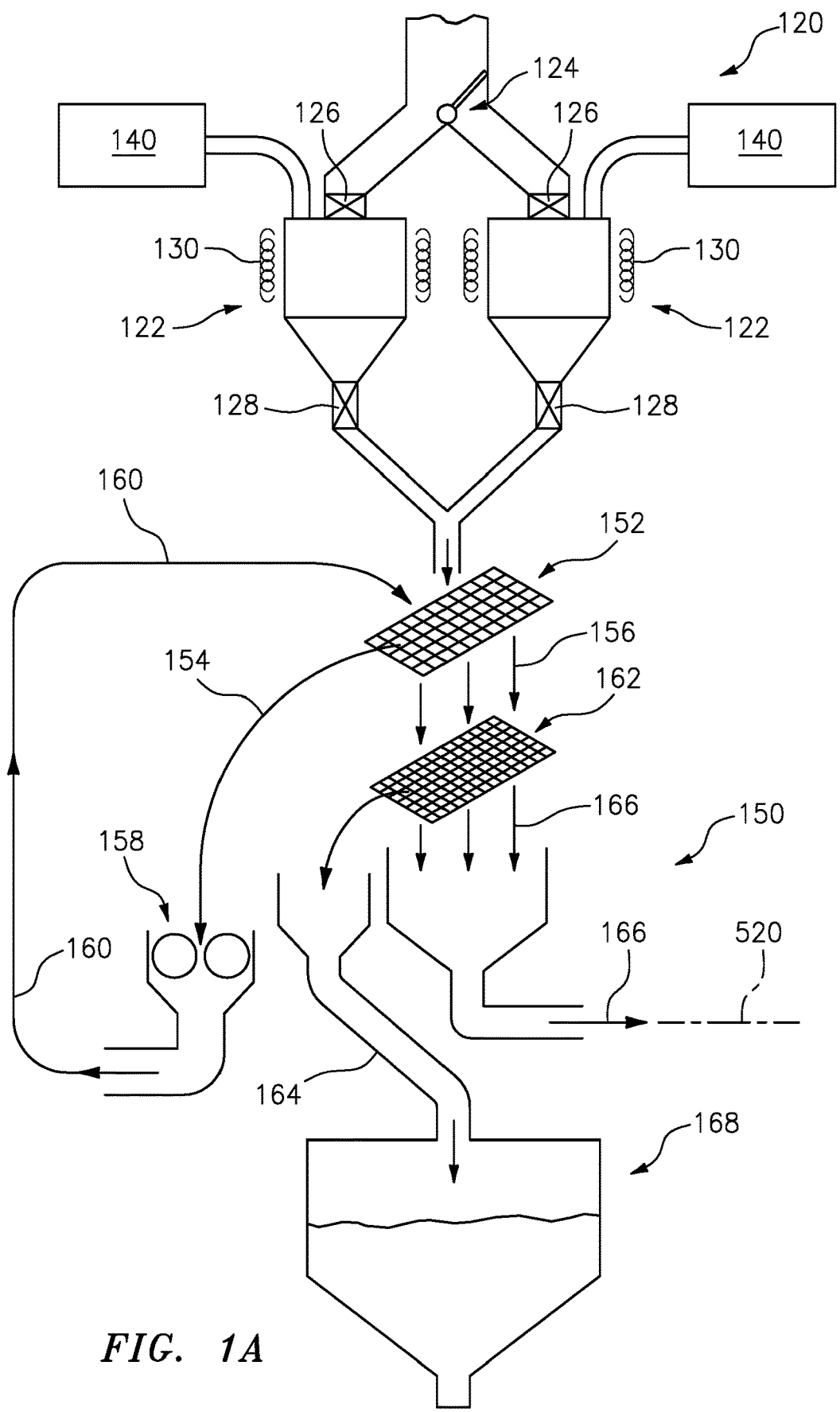
FIG. 1A is an enlarged view of a classifier of the apparatus of FIG. 1.

As noted above, the mixed powders pass along the flowpath for further processing. FIG. 1A shows further details of a processing system 120. The flowpath leads to one or more collectors 122. FIG. 1A shows an exemplary pair of collectors which may selectively receive powder passing along the flowpath (e.g., via a diverter such as a manually-controlled or actuator-driven flapper 124). The exemplary flowpath thus has respective branches through the respective collectors. Along the branches, the collectors each have an upstream isolation valve 126 and a downstream isolation valve 128 (e.g., pinch valves along tubing).

The exemplary collectors 122 also serve to remove the solvent. While one collector is open to the flowpath and receiving powder, the other is closed to the flowpath and doing solvent removal. The exemplary collectors have heating jackets 130 (e.g., resistive) or other heating elements for heating the powder to vaporize the solvent. A vacuum and condenser unit 140 (e.g., having a vacuum pump and a condensing heat exchanger (e.g., refrigerated or merely exchanging to ambient conditions)) draws the solvent vapor off. After solvent removal from a given collector, its downstream isolation valve 128 may be opened to discharge the de-solvented powder for further processing. After discharge, the downstream isolation valve 128 may then be closed and the upstream isolation valve opened to receive a subsequent charge of powder.

In the exemplary system, the flowpath branches reunite downstream of the downstream isolation valves 128 and the flowpath proceeds to a classifier 150. The exemplary classifier is a two-stage classifier with feedback. Each stage may comprise a screen or other foraminate medium. The first stage medium 152 splits a flow 154 of over-size particles from a remainder flow 156 which passes to the second stage. In the exemplary embodiment, the flow 154 passes to a crusher (e.g., rolling mill) 158 whose output flow 160 is fed back along an oversize particle flowpath to the first stage. The second stage medium 162 separates a flow 164 of acceptable size particles and passes a flow 166 of under-size particles. The flow 164 may pass to a hopper 168 and then to packaging and distribution for use as a spray feedstock.

The flow 166 may pass back along a return flowpath 520 from the classifier to the first flowpath. The return flowpath may pass to one or both of the sources 40 and 80 (e.g., directly merging with the flowpath 500 at the source 80 or directly merging with a second flowpath at the source 40 which in turns merges with the flowpath 500). The particular one may depend on a number of factors (e.g., degree of agglomeration, size and composition of the powders 41 and 81). Thus, this feedback or return flow 166 may account for some of the difference between the sources 40 and 80 even if the majority of powder in each is coming as identical fresh powder. If the bed powder (alloy powder 81) is sized to differentiate it from the agglomerates and source powders 41 and 43 (e.g., is larger than the agglomerates), it may require additional segregation for reuse (e.g., an additional coarse stage before those shown).

Temperature management of the respective powder sources may play a role in achieving desired final powder properties. Due to its introduction upstream along the conveyor 70, the alloy powder 81 may be referred to as a first powder. As noted above, the first powder (if included) may serve to protect the conveyor bed 72 surface. The first powder may be heated (e.g., by a heater 170 such as a resistive heating jacket (FIG. 1)) to a point where the vapor will not condense on it. This heating may be just to or above the boiling point or dew point of the solvent (e.g., by 5-15° F. (2.8-8.3° C.) above dew point), but slightly higher may help limit clumping of the agglomerates together by boiling off some or all of the solvent that arrives with the powders landing on it from the sprays 53 and 55.

Another exemplary heater 170 is a vapor jacket with controlled pressure (temperature for condensation of the vapor is proportional to the pressure (partial pressure of the vapor)). If the solvent vapor is used in the vapor jacket, then small adjustment from atmospheric pressure will result in temperature that is just above or below the dew point of the pure vapor at atmospheric pressure (thus, one may have precise control).

The alloy powder 41 forms a second powder at a temperature that may be selected to control condensation (e.g., less than dew point, such as a room temperature powder introduced to a 100° F. (38° C.) chamber). Control to this temperature may be a heating or a cooling/chilling jacket 172 (e.g., via a heat pump system 182). Cooling would allow the introduction of more solvent which may be desirable in some situations.

The fugitive powder is cooled (e.g., via a heat exchanger 174 associated with a pump system 184). This may be to a temperature of 0° C. (32° F.). This induces condensation of solvent on the fugitive powder spray. This temperature may be less than that of the metallic powder due to lower heat capacity of the fugitive and/or a desire to get a higher condensation directly on the fugitive than directly on the alloy powder.

If a nonmetallic filler (e.g., solid lubricant such as hBN or an alternative non-lubricant for coating friability/abradability, e.g., one or more oxides such as a metal oxide and/or rare earth oxide) is to be introduced there are a number of options. Some options involve preblending the nonmetallic filler with the alloy powder of the source 40 (and/or source 80 if present). Other options involve a source (not shown) similar to the sources 40 and 42 containing the filler. For example, this source may have a spray footprint larger than the footprint 92 (e.g., coextensive with the footprint 90).

The use of "first", "second", and the like in the following claims is for differentiation within the claim only and does not necessarily indicate relative or absolute importance or temporal order. Similarly, the identification in a claim of one element as "first" (or the like) does not preclude such "first" element from identifying an element that is referred to as "second" (or the like) in another claim or in the description.

Where a measure is given in English units followed by a parenthetical containing SI or other units, the parenthetical's units are a conversion and should not imply a degree of precision not found in the English units.

One or more embodiments have been described. Nevertheless, it will be understood that various modifications may be made. For example, when applied to an existing baseline process, details of such baseline may influence details of particular implementations. Accordingly, other embodiments are within the scope of the following claims.

What is claimed is:

1. An apparatus for manufacturing a powder, the apparatus comprising:
   a chamber;
   a temperature control system for the chamber interior;
   a conveyor within the chamber;
   a first powder source within or coupled to the chamber and configured to supply a first powder to a first powder flowpath;
   said first powder flowpath passing as from the first powder source through the chamber and passing along the conveyor;
   a second powder source within or coupled to the chamber and configured to supply a second powder to a second powder flowpath;
   said second powder flowpath passing from the second powder source and merging with the first powder flowpath along the conveyor;
   a third powder source within or coupled to the chamber and configured to supply a third powder to a third powder flowpath;
   said a third powder flowpath passing from the third powder source and merging with the first powder flowpath along the conveyor; and
   a vaporizer within the chamber or coupled thereto to deliver vaporized liquid solvent to the second powder powder along the second powder flowpath and the third along the third powder flowpath in the chamber.

2. The apparatus of claim 1 further comprising:
   a classifier; and
   a return flowpath from the classifier to the first flowpath.

3. The apparatus of claim 2 wherein:
   the classifier is a two-stage classifier with the first stage having an over-size particle flowpath passing back through a crusher.

4. The apparatus of claim 2 further comprising upstream of the classifier:
   first and second collectors having heating elements for heating agglomerated powder to vaporize the solvent; and
   a vacuum and condenser unit for drawing off solvent vapor.

5. The apparatus of claim 2 further comprising for each of the first and second collectors:
   upstream of the first and second collectors, an upstream isolation valve; and
   upstream of the classifier and downstream of the first and second collectors, a downstream isolation valve opened to receive a subsequent charge of powder.

6. The apparatus of claim 2 wherein the conveyor is a vibratory conveyor.

7. The apparatus of claim 1 wherein the conveyor is a vibratory conveyor.

8. The apparatus of claim 1 wherein the temperature control system comprises:
a heater.

9. The apparatus of claim 1 wherein:
the first powder source is a source of a first metallic powder;
the second powder source is a source of a second metallic powder; and
the third powder source is a source of a polymeric powder.

10. The apparatus of claim 9 wherein:
the first metallic powder and the second metallic powder are of alloys of the same composition.

11. The apparatus of claim 1 wherein the second powder source has:
a heat pump system for cooling the second powder.

12. The apparatus of claim 1 wherein the third powder source has:
a heat pump system for cooling the third powder.

13. The apparatus of claim 1 wherein:
the liquid solvent comprises acetone.

14. An apparatus for manufacturing an agglomerate powder, the apparatus comprising:
a chamber;
a temperature control system for the chamber interior;
a conveyor within the chamber;
a first powder source of a first powder within or coupled to the chamber;
a first powder flowpath from the first powder source through the chamber and passing along the conveyor;
a second powder source of a second powder within or coupled to the chamber;
a second powder flowpath from the second powder source merging with the first powder flowpath along the conveyor;
a third powder source of a third powder within or coupled to the chamber;
a third powder flowpath from the third powder source merging with the first powder flowpath along the conveyor; and
a vaporizer within the chamber or coupled thereto to deliver vaporized liquid solvent to the second powder along the second powder flowpath and the third powder along the third powder flowpath in the chamber for agglomerating the second and third powders for forming the agglomerate powder.

15. The apparatus of claim 14 further comprising:
a classifier; and
a return flowpath from the classifier to the first flowpath.

16. The apparatus of claim 14 wherein the second powder source has:
a heat pump system for cooling the second powder.

17. The apparatus of claim 16 wherein the third powder source has:
a heat pump system for cooling the third powder.

18. The apparatus of claim 14 wherein the third powder source has:
a heat pump system for cooling the third powder.

19. An apparatus for manufacturing a powder, the apparatus comprising:
a chamber;
a temperature control system for the chamber interior;
a conveyor within the chamber;
a first powder source within or coupled to the chamber;
a first powder flowpath from the first powder source through the chamber and passing along the conveyor;
a second powder source within or coupled to the chamber and including means for cooling the second powder;
a second powder flowpath from the second powder source merging with the first powder flowpath along the conveyor;
a third powder source within or coupled to the chamber and including means for cooling the third powder;
a third powder flowpath from the third powder source merging with the first powder flowpath along the conveyor; and
a vaporizer within the chamber or coupled thereto to deliver vaporized liquid to the chamber for condensing on at least one of the second powder and the third powder to agglomerate the first, second, and third powders into an agglomerate powder.

20. The apparatus of claim 19 further comprising:
a classifier; and
a return flowpath from the classifier to the first flowpath.

* * * * *